(No Model.)
J. LISTER.
EXPANSION JOINT.
No. 502,733. Patented Aug. 8, 1893.
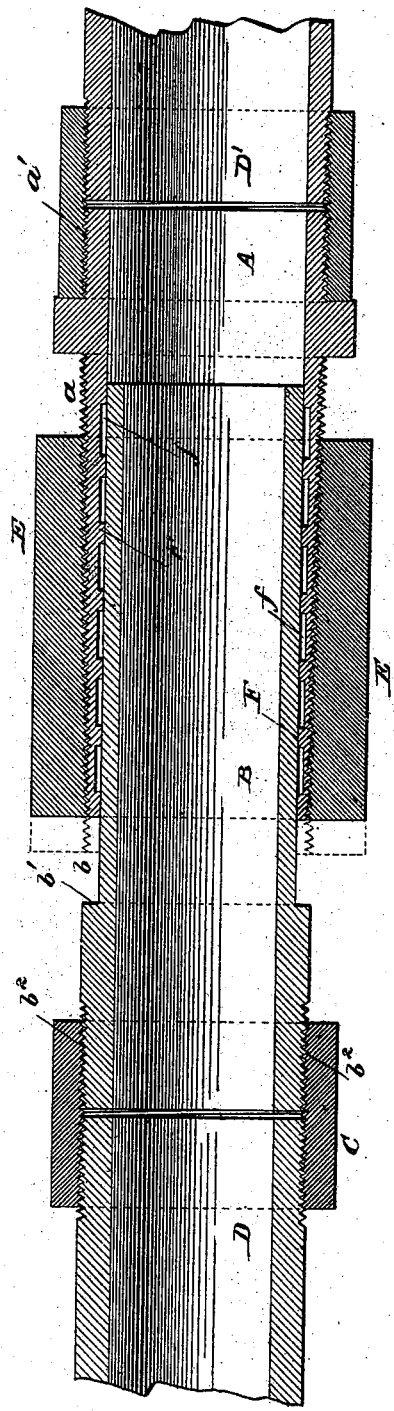
Witnesses.
J. F. Coleman
M. B. May.
Inventor
Joseph Lister
by Doubleday & Bliss
Attys.

UNITED STATES PATENT OFFICE.

JOSEPH LISTER, OF CHICAGO, ILLINOIS.

EXPANSION-JOINT.

SPECIFICATION forming part of Letters Patent No. 502,733, dated August 8, 1893.

Application filed November 5, 1892. Serial No. 451,067. (No model.)

*To all whom it may concern:*

Be it known that I, JOSEPH LISTER, a citizen of the United States, residing at Chicago, in the county of Cook and State of Illinois, have invented certain new and useful Improvements in Expansion-Joints, of which the following is a specification, reference being had therein to the accompanying drawing.

This invention relates to an improved device for connecting together the ends of two adjacent pipes or tubes. Among the several objects aimed at is that of providing a joint or connecting device which shall be simple in construction, and which while insuring that the union shall be tight against the passage of steam, air, water, &c., will, nevertheless, be of such nature that longitudinal expansion of the pipes and of the coupler devices shall be possible when necessary without loosening the joint.

It is well known that where pipes or tubes in considerable lengths are used, the variations in dimensions due to varying temperatures are such as to be the source of great inconvenience, and difficulty. For instance, the pipes which are used to convey steam for heating and other purposes through large buildings, are subject to so much contraction and expansion longitudinally, that there must be inserted at frequent intervals stuffing boxes to allow for this variation in length. These stuffing boxes are generally large, and unsightly. They require the use of a large number of parts, and also require frequent examination and constant care to see that they are in proper working condition. Again, there are many places where long tubes or pipes are used, and where the expense and trouble incident to the employment of stuffing boxes prevents their use entirely, and therefore, the pipes must be used with the above described disadvantages incident to them.

The drawing illustrates some of the forms of devices which can be used to carry out my invention.

The figure is a longitudinal section of an expansion joint embodying my improvements.

In the drawing A and B indicate two tubes or pipes. These may be of any suitable diameter, and of any required length. As shown they are of the nature of two comparatively short nipples or pipe sections. The nipple or pipe B is at one end made smooth at $b$, by turning on or otherwise, and preferably is reduced to form a shoulder at $b'$. At $b^2$ there is a thread formed by which this nipple or thimble can be connected to another pipe section or to a coupler as at C, which in turn is connected to a pipe as at D. The other part A is formed with a tapering surface at $a$, and with a thread at $a'$ for connecting it to the next pipe section D', either directly or indirectly. When made as in the drawing there is a wrench flange formed at A' by which the nipple can be turned so as to be longitudinally moved in one direction or the other.

Upon the tapered exterior surface $a$ of the nipple or pipe A there is placed a clamp E, which is adapted to move toward and from the thicker part of the nipple, and crowd the metal thereof down upon, or release it from the part $b$.

In order to get the best results, particularly with large joints I make the part A of copper, and the part B of steel. The copper is of such consistency that it can be easily forced in against the interior tube, and yet will expand sufficiently when the pressure is withdrawn, to allow the two engaged parts to slip upon each other.

A manner of forcing the clamping collar E along longitudinally on the nipple is shown in the drawing. The surface $a$ is threaded, and the interior surface of the clamp is also threaded to correspond. That is to say, the clamp E is of the nature of a hollow nut with an interior tapering chamber. A turn or two of this clamp nut will advance it so far longitudinally as to exert a powerful pressure upon the tapered part of the outer nipple, and force it against the inner. And vice versa, if the nut be turned backward slightly, the pressure is reduced to such an extent that the parts A and B can slip longitudinally. These parts are telescopically connected, that is to say so connected that they can slip on each other both before and after the clamp is loosened.

The elements above described I have heretofore used for the purpose of effecting a permanently tight joining of stationary pipes.

To form an expansion joint, I construct the interior surface of the nipple A in a peculiar manner, that is I form a series of rings F, F, of any suitable number. This can be done by turning out a series of annular recesses $f, f$, so as to leave the rings F projecting inward. The inner surfaces of the rings fit against the surface $b$ of the pipe B, and when pressure is exerted through the clamp E, they furnish a steam-tight joint. The recesses $f, f$, reduce the amount of surface which is in contact, and the friction which is between them is correspondingly reduced, so that under a proper adjustment the parts A and B can slip longitudinally of each other, and yet have a perfectly tight joint.

The number and width of the rings F will be determined by the conditions to which the joint is to be subjected, as will also the degree of pressure which would be exerted by the clamp E.

It will be seen that by three cheaply constructed, and easily applied parts I accomplish all that is attained by the more expensive and cumbersome packing boxes or gland joints which are now in use, and obviate entirely the necessity of packing in the form of "waste" and oils, and provide a joint which can be adjusted at any time to meet any conditions.

What I claim is—

1. The herein described expansion joint, consisting of two telescopically connected metal pipes, the outer one of which has a tapering surface on the exterior and a series of ring-like contact surfaces on the interior, in combination with an external clamp adapted to fit the said tapered surface and to be forced longitudinally along the same to crowd the outer pipe against the inner, substantially as set forth.

2. In an expansion joint, the combination of the inner pipe the outer taper surfaced pipe, provided with a screw thread on the taper surface and formed with a series of ring-like contact surfaces on the interior, and a hollow taper threaded clamp engaging with the aforesaid thread on the outer pipe, substantially as set forth.

In testimony whereof I affix my signature in presence of two witnesses.

JOSEPH LISTER.

Witnesses:
LORENZ W. POST,
THOMAS KEARNEY.